US010008051B2

(12) United States Patent
Green et al.

(10) Patent No.: US 10,008,051 B2
(45) Date of Patent: Jun. 26, 2018

(54) METHOD FOR DETECTING A BLEED AIR SYSTEM FAULT

(71) Applicant: GE Aviation Systems Limited, Cheltenham, Gloucestershire (GB)

(72) Inventors: Donna Louise Green, Southampton (GB); Peter Robin Knight, Southampton (GB); Oliver Thuong, Southampton (GB)

(73) Assignee: GE Aviation Systems Limited, Cheltenham (GB)

( * ) Notice: Subject to any disclaimer, the term of this patent is extended or adjusted under 35 U.S.C. 154(b) by 34 days.

(21) Appl. No.: 15/115,916

(22) PCT Filed: Feb. 10, 2015

(86) PCT No.: PCT/EP2015/052721
§ 371 (c)(1),
(2) Date: Aug. 2, 2016

(87) PCT Pub. No.: WO2015/121235
PCT Pub. Date: Aug. 20, 2015

(65) Prior Publication Data
US 2017/0169632 A1  Jun. 15, 2017

(30) Foreign Application Priority Data

Feb. 11, 2014  (GB) .................. 1402342.8

(51) Int. Cl.
*G07C 5/08* (2006.01)
*F02C 6/08* (2006.01)

(52) U.S. Cl.
CPC .............. *G07C 5/0825* (2013.01); *F02C 6/08* (2013.01); *G07C 5/0808* (2013.01);
(Continued)

(58) Field of Classification Search
CPC ....... G07C 5/0825; G07C 5/0808; F02C 6/08; F05D 2220/323; F05D 2270/306; F05D 2260/80
See application file for complete search history.

(56) References Cited

U.S. PATENT DOCUMENTS 9,449,438 B2 * 9/2016 Catt ..................... B64C 19/00
2003/0173686 A1 * 9/2003 Nonaka ................ F02M 17/04
261/51

(Continued)

FOREIGN PATENT DOCUMENTS

| EP | 0507725 A1 | 10/1992 |
|----|------------|---------|
| EP | 2551805 A1 | 1/2013  |
| WO | 8502042 A1 | 5/1985  |

OTHER PUBLICATIONS

Search Report issued in connection with corresponding GB priority filing 1402342.8 dated Aug. 19, 2014.

(Continued)

*Primary Examiner* — Frederick M Brushaber
(74) *Attorney, Agent, or Firm* — General Electric Company; Brian Overbeck (57) ABSTRACT

A method of detecting a fault in a bleed air system of an aircraft having multiple engines is disclosed. The method includes transmitting a bleed air flow rate from multiple engines, determining a difference between the transmitted bleed air flow rates to define a difference value, and determining, by a controller, a fault condition with the bleed air system based on the difference value.

11 Claims, 5 Drawing Sheets

(52) U.S. Cl.
CPC .... *F05D 2220/323* (2013.01); *F05D 2260/80* (2013.01); *F05D 2270/306* (2013.01)

(56) References Cited

U.S. PATENT DOCUMENTS

| | | | |
|---|---|---|---|
| 2006/0059920 A1* | 3/2006 | Saunders | F02C 6/02 60/782 |
| 2006/0174628 A1* | 8/2006 | Mikhail | B64D 13/00 60/772 |
| 2010/0326089 A1 | 12/2010 | Weber | |
| 2014/0336872 A1* | 11/2014 | Howard | B64F 5/60 701/33.7 |

OTHER PUBLICATIONS

International Search Report and Written Opinion issued in connection with corresponding PCT application PCT/EP2015/052721 dated May 4, 2015.

* cited by examiner

METHOD FOR DETECTING A BLEED AIR SYSTEM FAULT

BACKGROUND

Contemporary aircraft have bleed air systems that take hot air from the engines of the aircraft for use in other systems on the aircraft including air conditioning and pressurization. Currently, airlines and maintenance personnel wait until a fault or problem occurs with the system and then attempt to identify the cause and fix it during either scheduled or, more likely, unscheduled maintenance.

BRIEF DESCRIPTION

In one embodiment, a method of detecting a fault in a bleed air system of an aircraft includes transmitting a bleed air flow rate from multiple engines, determining a difference between the transmitted bleed air flow rates to define a difference value, comparing the difference value to a reference difference value, determining, by a controller, a fault condition with the bleed air system when the comparing indicates the difference value satisfies the reference difference value, and providing an indication of the fault upon the determining of the fault condition.

DETAILED DESCRIPTION

Figure 1:
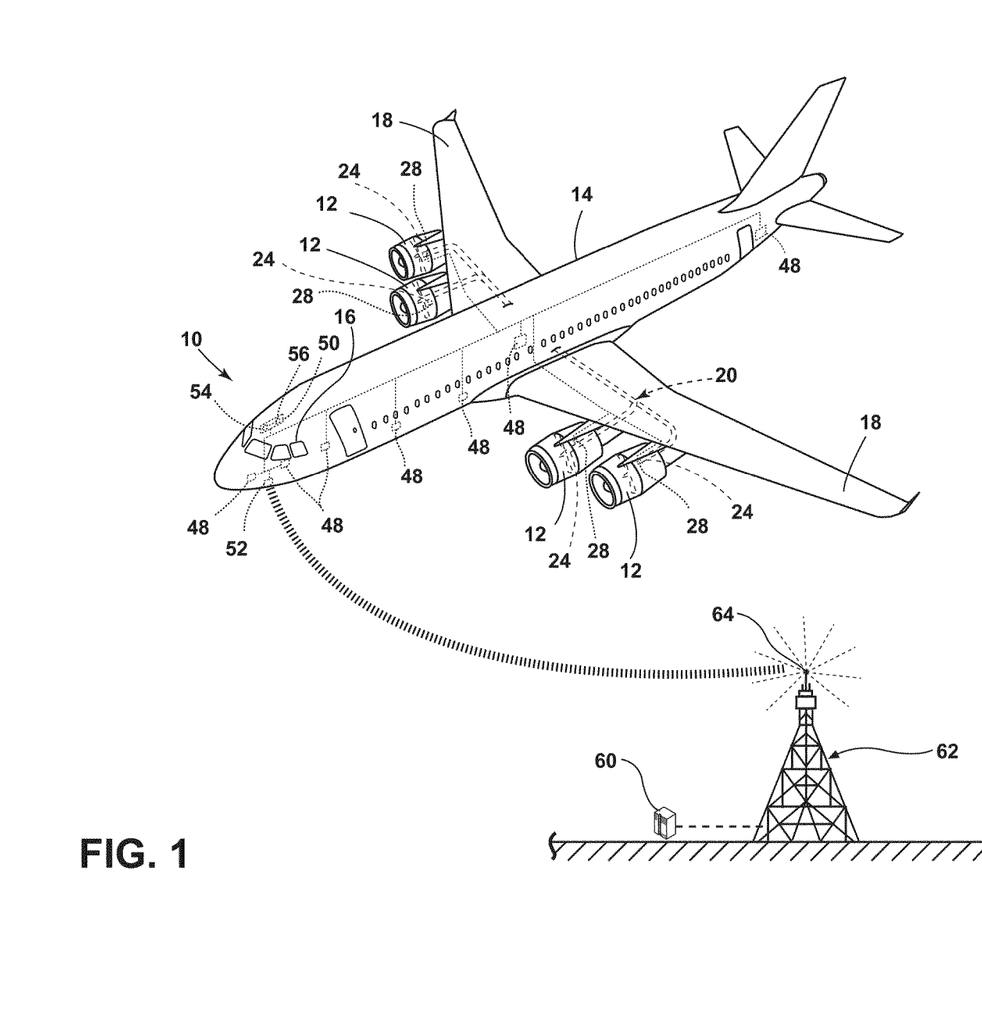
FIG. 1 is a perspective view of an aircraft and a ground system in which embodiments of the innovation may be implemented.

FIG. 1 illustrates an aircraft 10 that may include a bleed air system 20, only a portion of which has been illustrated for clarity purposes, and may execute embodiments of the innovation. As illustrated, the aircraft 10 may include multiple engines 12, a fuselage 14, a cockpit 16 positioned in the fuselage 14, and wing assemblies 18 extending outward from the fuselage 14. While a commercial aircraft 10 has been illustrated, it is contemplated that embodiments of the innovation may be used in any type of aircraft 10. Further, while two engines 12 have been illustrated on each wing assembly 18, it will be understood that any number of engines 12 including a single engine 12 on each wing assembly 18 may be included.

Figure 2:
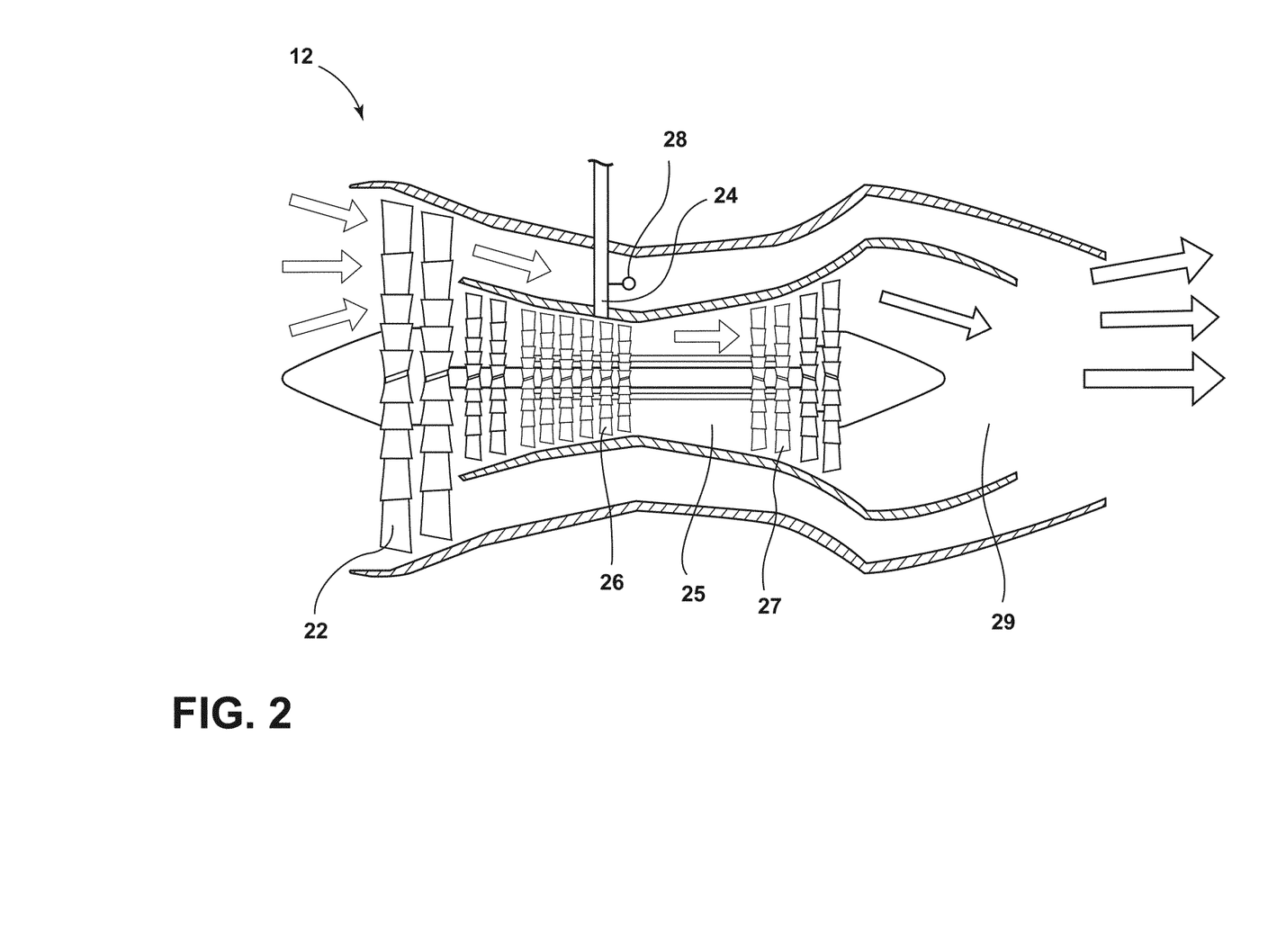
FIG. 2 is a schematic view of a portion of an exemplary bleed air system.

Each engine 12 may include a fan 22, compressor(s) 26, combustion section 25, turbine(s) 27, and exhaust 29 (FIG. 2). The bleed air system 20 may be connected to each of the engines 12 such that high temperature and/or high pressure air may be used within the aircraft 10 including for de-icing, pressurizing the cabin, etc. More specifically, various bleed ports 24 may be connected to various portions of the engine 12 to provide highly compressed air to the bleed air system 20. For example, the bleed air system 20 may be fluidly coupled to at least one compressor 26 (FIG. 2) of the turbine engine 12 to bleed air from the at least one compressor 26 and cool the bleed air. It will be understood that the turbine engine 12 may have several compressors 26 including a high-pressure compressor and a low-pressure compressor. For example, the bleed port 24 may be connected to the high pressure compressor 26.

Various components may be included in the bleed air system 20 including various valves (not shown) and various sensors 28 including by way of non-limiting example flow rate sensors 28. It will be understood that any number of flow rate sensors 28 may be included in the bleed air system 20 including that the flow rate sensors 28 may be included at various stages in the bleed air system 20. Further, one or more control mechanisms for the bleed air system 20 may be included in the cockpit 16 and may be operated by a pilot located therein.

A plurality of additional aircraft systems 48 that enable proper operation of the aircraft 10 may also be included in the aircraft 10 as well as a controller 50, and a communication system having a wireless communication link 52. The controller 50 may be operably coupled to the bleed air system 20 including its sensors 28 and the plurality of aircraft systems 48. The controller 50 may also be connected with other controllers of the aircraft 10. The controller 50 may include memory 54, the memory 54 may include random access memory (RAM), read-only memory (ROM), flash memory, or one or more different types of portable electronic memory, such as discs, DVDs, CD-ROMs, etc., or any suitable combination of these types of memory. The controller 50 may include one or more processors 56, which may be running any suitable programs. The controller 50 may be a portion of an FMS or may be operably coupled to the FMS.

A computer searchable database of information may be stored in the memory 54 and accessible by the processor 56. The processor 56 may run a set of executable instructions to display the database or access the database. Alternatively, the controller 50 may be operably coupled to a database of information. For example, such a database may be stored on an alternative computer or controller. It will be understood that the database may be any suitable database, including a single database having multiple sets of data, multiple discrete databases linked together, or even a simple table of data. It is contemplated that the database may incorporate a number of databases or that the database may actually be a number of separate databases. The database may store data that may include, among other things, historical data related to the reference value for the sensor outputs, as well as historical bleed air system data for the aircraft 10 and related to a fleet of aircraft. The database may also include reference values including historic values or aggregated values.

Alternatively, it is contemplated that the database may be separate from the controller 50 but may be in communication with the controller 50 such that it may be accessed by the controller 50. For example, it is contemplated that the database may be contained on a portable memory device and in such a case, the aircraft 10 may include a port for receiving the portable memory device and such a port would be in electronic communication with controller 50 such that controller 50 may be able to read the contents of the portable memory device. It is also contemplated that the database may be updated through the wireless communication link 52 and that in this manner, real time information may be included in the database and may be accessed by the controller 50.

Further, it is contemplated that such a database may be located off the aircraft 10 at a location such as an airline operation center, flight operations department control, or another location. The controller 50 may be operably coupled to a wireless network over which the database information may be provided to the controller 50.

While a commercial aircraft has been illustrated, it is contemplated that portions of the embodiments of the innovation may be implemented anywhere including in a controller or controller 60 at a ground system 62. Furthermore, the database(s) as described above may also be located in a destination server or a controller 60, which may be located at and include the designated ground system 62. Alternatively, the database may be located at an alternative ground location. The ground system 62 may communicate with other devices including the controller 50 and databases located remote from the controller 60 via a wireless communication link 64. The ground system 62 may be any type of communicating ground system 62 such as an airline control or flight operations department.

One of the controller 50 and the controller 60 may include all or a portion of a computer program having an executable instruction set for detecting a bleed air system fault in the aircraft 10. Such detected faults may include improper operation of components as well as failure of components. Regardless of whether the controller 50 or the controller 60 runs the program for detecting the fault, the program may include a computer program product that may include machine-readable media for carrying or having machine-executable instructions or data structures stored thereon. Such machine-readable media may be any available media, which can be accessed by a general purpose or special purpose computer or other machine with a processor. Generally, such a computer program may include routines, programs, objects, components, data structures, algorithms, etc. that have the technical effect of performing particular tasks or implementing particular abstract data types. Machine-executable instructions, associated data structures, and programs represent examples of program code for executing the exchange of information as disclosed herein. Machine-executable instructions may include, for example, instructions and data, which cause a general-purpose computer, special purpose computer, or special purpose processing machine to perform a certain function or group of functions.

It will be understood that the controller 50 and the controller 60 merely represent two exemplary embodiments that may be configured to implement embodiments or portions of embodiments of the innovation. During operation, either the controller 50 and/or the controller 60 may detect a bleed air system fault. By way of non-limiting example, while the aircraft 10 is being operated, the sensors 28 may output data relevant to various characteristics of the bleed air system 20. The controller 50 and/or the controller 60 may utilize inputs from the sensors 28, aircraft systems 48, the database(s), and/or information from airline control or flight operations department to detect the bleed air system fault. Among other things, the controller 50 and/or the controller 60 may analyze the data output by the sensors 28 over time to determine drifts, trends, steps, or spikes in the operation of the bleed air system 20. The controller 50 and/or the controller 60 may also analyze the bleed air system data to determine differences in flow rates between the two engines 12 on the aircraft 10 and to detect faults in the bleed air system 20 based thereon. Once a bleed air system fault has been detected, an indication may be provided on the aircraft 10 and/or at the ground system 62. It is contemplated that the detection of the bleed air system fault may be done during flight, may be done post flight, or may be done after any number of flights. The wireless communication link 52 and the wireless communication link 64 may both be utilized to transmit data such that the fault may be detected by either the controller 50 and/or the controller 60.

It will be understood that details of environments that may implement embodiments of the innovation are set forth in order to provide a thorough understanding of the technology described herein. It will be evident to one skilled in the art, however, that the exemplary embodiments may be practiced without these specific details. The exemplary embodiments are described with reference to the drawings. These drawings illustrate certain details of specific embodiments that implement a module or method, or computer program product described herein. However, the drawings should not be construed as imposing any limitations that may be present in the drawings. The method and computer program product may be provided on any machine-readable media for accomplishing their operations. The embodiments may be implemented using an existing computer processor, or by a special purpose computer processor incorporated for this or another purpose, or by a hardwired system. Further, multiple computers or processors may be utilized including that the controller 50 and/or the controller 60 may be formed from multiple controllers. It will be understood that the controller detecting the fault may be any suitable controller including that the controller may include multiple controllers that communicate with each other.

As noted above, embodiments described herein may include a computer program product comprising machine-readable media for carrying or having machine-executable instructions or data structures stored thereon. Such machine-readable media may be any available media, which may be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium that can be used to carry or store desired program codes in the form of machine-executable instructions or data structures and that can be accessed by a general purpose or special purpose computer or other machine with a processor. When information is transferred or provided over a network or another communication connection (either hardwired, wireless, or a combination of hardwired or wireless) to a machine, the machine properly views the connection as a machine-readable medium. Thus, any such a connection is properly termed a machine-readable medium. Combinations of the above are also included within the scope of machine-readable media. Machine-executable instructions comprise, for example, instructions and data, which cause a general-purpose computer, special purpose computer, or special purpose processing machines to perform a certain function or group of functions.

Embodiments will be described in the general context of method steps that may be implemented in one embodiment by a program product including machine-executable instructions, such as program codes, for example, in the form of program modules executed by machines in networked environments. Generally, program modules include routines, programs, objects, components, data structures, etc. that have the technical effect of performing particular tasks or implement particular abstract data types. Machine-executable instructions, associated data structures, and program modules represent examples of program codes for executing steps of the method disclosed herein. The particular sequence of such executable instructions or associated data structures represent examples of corresponding acts for implementing the functions described in such steps.

Embodiments may be practiced in a networked environment using logical connections to one or more remote computers having processors. Logical connections may include a local area network (LAN) and a wide area network (WAN) that are presented here by way of example and not limitation. Such networking environments are commonplace in office-wide or enterprise-wide computer networks, intranets and the internet and may use a wide variety of different communication protocols. Those skilled in the art will appreciate that such network computing environments will typically encompass many types of computer system configurations, including personal computers, hand-held devices, multiprocessor systems, microprocessor-based or programmable consumer electronics, network PCs, minicomputers, mainframe computers, and the like.

Embodiments may also be practiced in distributed computing environments where tasks are performed by local and remote processing devices that are linked (either by hardwired links, wireless links, or by a combination of hardwired or wireless links) through a communication network. In a distributed computing environment, program modules may be located in both local and remote memory storage devices.

Figure 3:
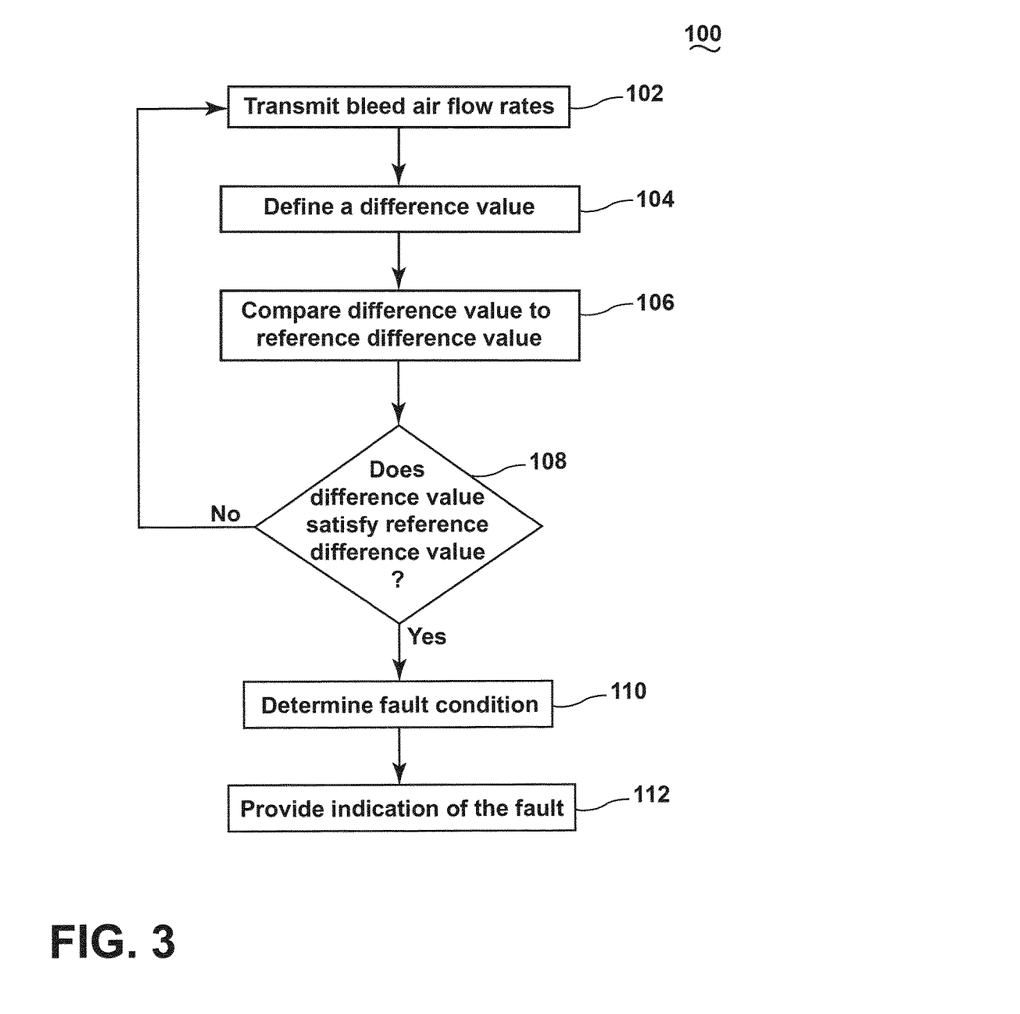
FIG. 3 is a flowchart showing a method of detecting a bleed air system fault in an aircraft according to an embodiment.

In accordance with an embodiment of the innovation, FIG. 3 illustrates a method 100, which may be used for detecting a fault in the bleed air system 20 such a detected fault may include a detected failure. The method 100 begins at 102 by transmitting sensor signals from sensors 28 of the bleed air system 20 to define sensor outputs relevant to a characteristic of the bleed air system 20. More specifically, bleed air flow rates of multiple engines 12 may be transmitted including that flow rates related to each of the multiple engines 12 may be transmitted. This may include that such flow rates may be simultaneously transmitted from the sensors 28 in the aircraft 10. It is contemplated that the transmitted flow rates may include raw data from which a variety of other information may be derived or otherwise extracted to define the transmitted data. It will be understood that regardless of whether the sensor output is transmitted directly or derived from transmitted output, the output may be considered transmitted data. The sensor output may be transmitted in any suitable manner including that the data may be transmitted multiple times per flight including that the data may be transmitted continuously during one or more phases of flight.

At 104, a difference between the transmitted bleed air flow rates may be determined and a difference value may be defined therefrom. In the instance where the data is transmitted continuously, the difference value may also be determined continuously.

At 106, the difference value may be compared to a reference difference value. The reference difference value may be any suitable reference difference value related to the determined difference including that the reference value may be an acceptable difference threshold such as a predetermined flow rate difference value. By way of non-limiting example, such a predetermined flow rate difference value may be 2 kg/s. The reference difference value may also include a historical reference difference value. Thus, the difference between the transmitted signals may be compared to results obtained from previous flights for the same aircraft and against the whole fleet of aircraft. It will be understood that any suitable comparison may be made.

At 108, it may be determined if the comparison indicates the difference value satisfied the reference difference value. At 110, a fault condition in the bleed air system may be determined based on the determination at 108. For example, a fault in the bleed air system 20 may be detected when the determination at 108 indicates that the difference value satisfies the reference difference value. The term "satisfies" is used herein to mean that the difference value satisfies the reference difference value, such as being equal to, less than, or greater than the threshold value. It will be understood that such a determination may easily be altered to be satisfied by a positive/negative comparison or a true/false comparison. For example, a less than threshold value can easily be satisfied by applying a greater than test when the data is numerically inverted. If the difference value does not satisfy the reference difference value, the method may continue to transmit flow rates, make comparisons, etc.

Any number of determinations may be made at 108 to determine if the difference value satisfies the reference difference value. For example, to determine a fault in the bleed air system 20 with the difference value, the comparison may determine a shift or sudden change of the difference value much larger than the normal noise in the signals from the sensors 28. Such a shift may be thought of as the difference value satisfying a reference difference value. By way of alternative example, the absolute difference may be used as the difference between the flows is normally small, and it is possible to define a threshold above which a bleed-air fault is detectable. This too may be thought of as the difference value satisfying the reference difference value. By way of further non-limiting example, when the comparison indicates a difference greater than the acceptable difference threshold the fault may be determined.

In implementation, the difference value, reference difference value, and comparisons or determinations may be converted to an algorithm to detect faults in the bleed air system 20. Such an algorithm may be converted to a computer program comprising a set of executable instructions, which may be executed by the controller 50 and/or the controller 60. Alternatively, the computer program may include a model, which may be used to detect faults in the bleed air system 20. A model may include the use of reasoning networks, flow charts, or decision trees. The model may be implemented in software as an algorithm, such as one or more mathematical algorithms. Fault detection may be based upon understanding of the system and patterns in the data compared to previous faults. It will be understood that a number of faults with the bleed air system 20 may be detected in this manner. For example, faults caused by failures in the valves and actuators that control the amount of air from the engines 12, software faults, incorrect software configurations, etc. may be detected.

At 112, the controller 50 and/or the controller 60 may provide an indication of the detected fault in the bleed air system 20 determined at 110. The indication may be provided in any suitable manner at any suitable location including in the cockpit 16 and at the ground system 62. For example, the indication may be provided on a primary flight display (PFD) in a cockpit 16 of the aircraft 10. More specifically, the indication may include an alert regarding the fault, which may be provided on a display within the aircraft 10. If the controller 50 ran the program, then the suitable indication may be provided on the aircraft 10 and/or may be uploaded to the ground system 62. Alternatively, if the controller 60 ran the program, then the indication may be uploaded or otherwise relayed to the aircraft 10. Alternatively, the indication may be relayed such that it may be provided at another location such as an airline control or flight operations department.

It will be understood that the method of detecting a bleed air system fault is flexible and the method illustrated is merely for illustrative purposes. For example, the sequence of steps depicted is for illustrative purposes only, and is not meant to limit the method 100 in any way, as it is understood that the steps may proceed in a different logical order or additional or intervening steps may be included without detracting from embodiments of the innovation. Further still, the comparing at 106, determination at 108 and determination at 110 may be combined in any suitable manner. By way of further example, an average of the bleed-air flow rates transmitted from the multiple engines 12 may be determined to define an average transmitted bleed air flow rate. In such an instance, determining the difference at 104 may include comparing the transmitted bleed air flow rate of one of the multiple engines 12 with the average transmitted bleed air flow rate to define the difference value. It is contemplated that the average transmitted bleed air flow rate may be a running average. It will be understood that the transmitted bleed air flow rate of one of the multiple engines 12 that is used for the comparing at 106 may also be used in the determining the average transmitted bleed air flow rate. Further, it may be understood that the transmitting, the comparing, and the determining may be continuous.

Figure 4:
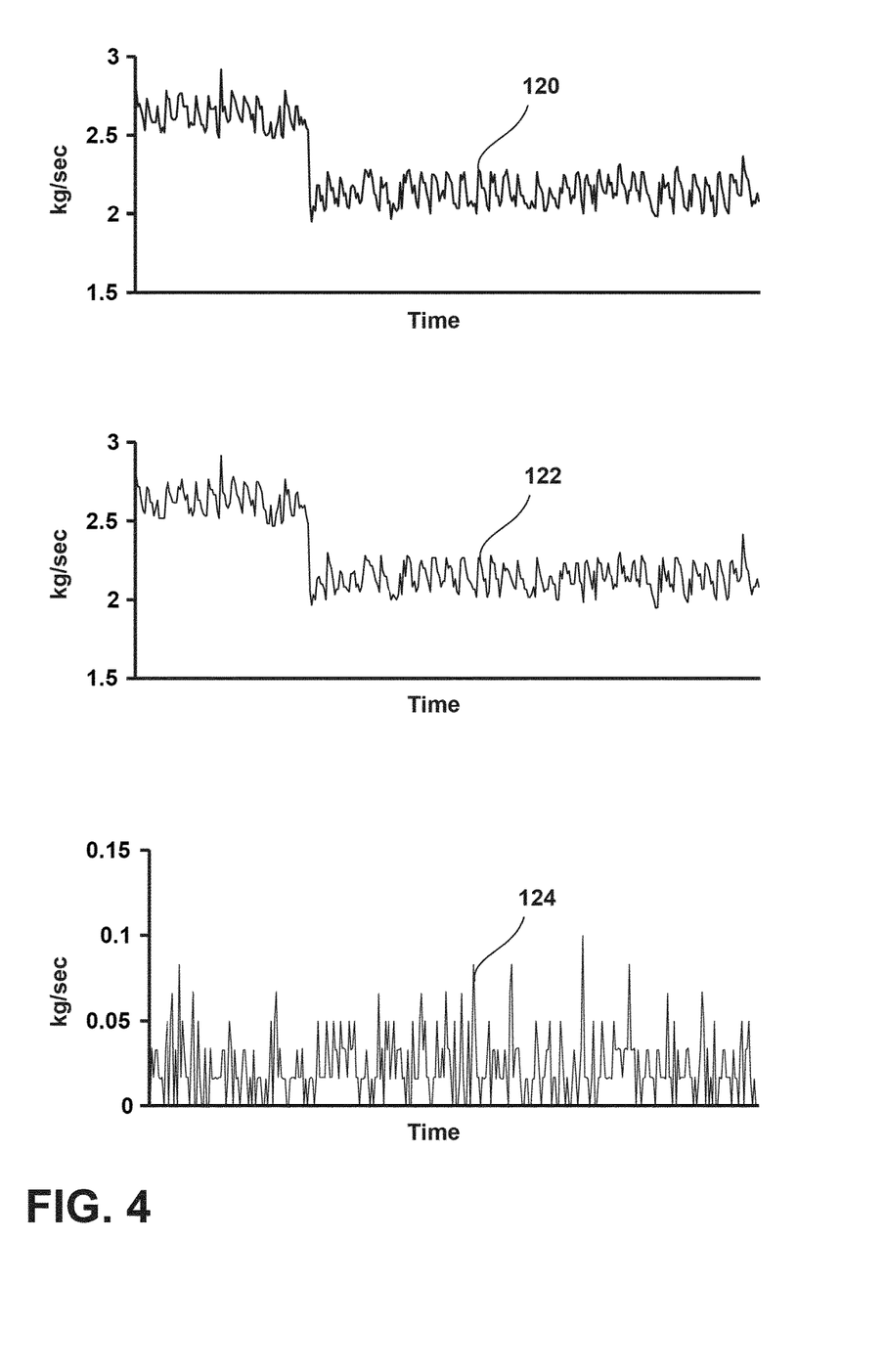
FIG. 4 is a graphical illustration of exemplary flow rates as well as a difference value.

FIG. 4 illustrates an example of a first flow 120, a second flow 122, and a difference value 124. While the first flow 120 and the second flow 122 experience a shift the difference value 124 does not. Such an example illustrates that a change of environmental conditions may cause the first flow 120 and the second flow 122 to shift following a similar pattern. Such a shift does not affect the difference value 124.

Figure 5:
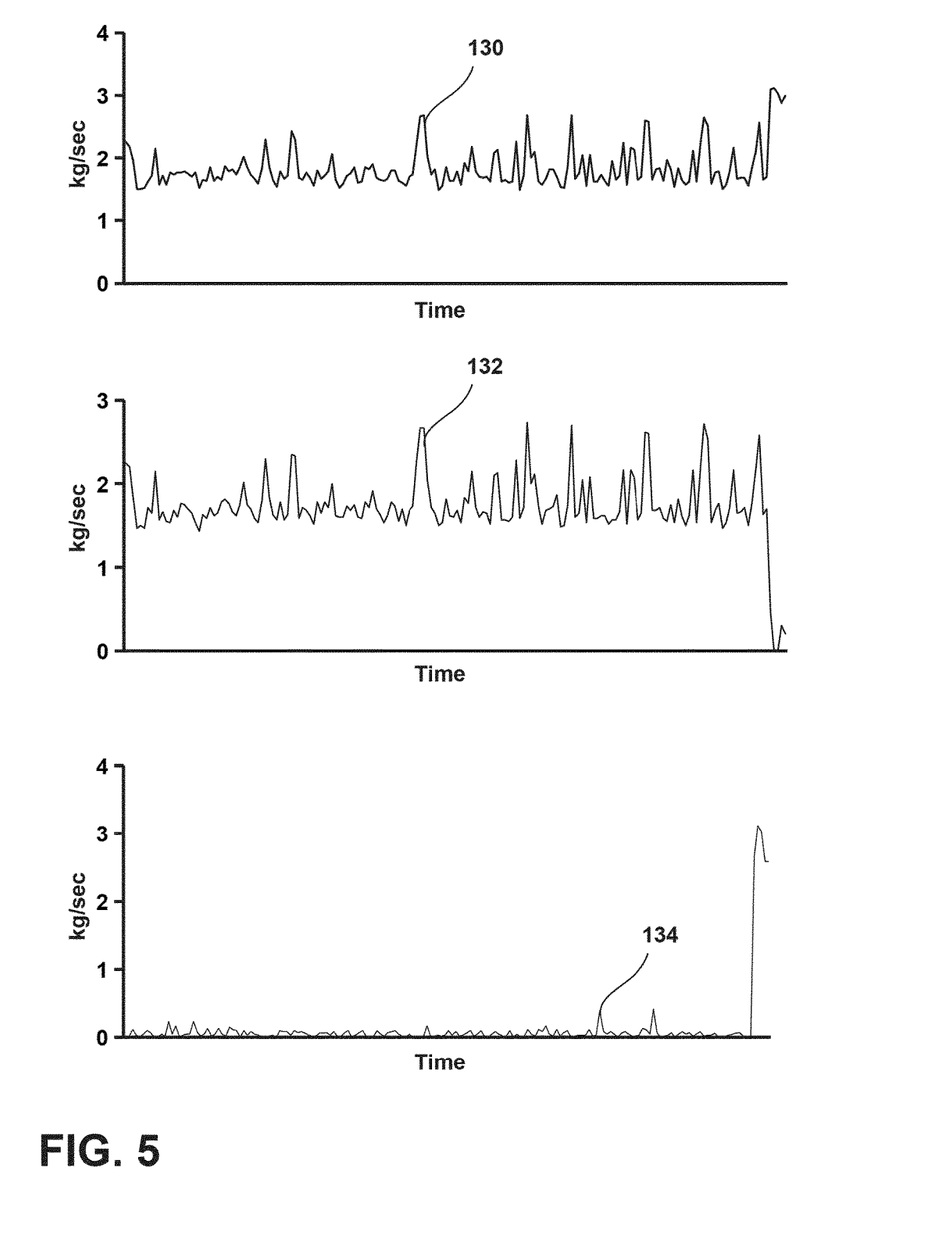
FIG. 5 is a graphical illustration of exemplary flow rates as well as a difference value.

Conversely, FIG. 5 illustrates an example of a first flow 130, a second flow 132, and a difference value 134, which correlates to a fault in the bleed air system 20. In the example, the second flow 132 shifts away from the first flow 130 and the difference value 134 indicates such. While the noise in the first flow 130 and the second flow 132 may make the shift difficult to detect, the difference value 134 has a very clear shift.

The above examples illustrate that sometimes both transmitted flows may exhibit an abnormal behavior, such as a shift, resulting from a change in environmental conditions, and not a fault. In that case, the difference value will not be affected and no false alarm will be triggered. On the other hand, individual transmitted flows may have a high level of noise, making the shift caused by a fault less obvious and therefore making faults difficult to detect; however, the difference value shows such shifts much more clearly and allows detection of the fault.

Potentially beneficial effects of the above described embodiments include that data gathered by the aircraft may be utilized to detect a bleed air system fault. This reduces maintenance times and the operational impact of faults and issues due to the bleed air system. This allows for cost savings by reducing maintenance cost, rescheduling cost, and minimizing operational impacts including minimizing the time aircraft are grounded.

This written description uses examples to disclose the innovation, including the best mode, and also to enable any person skilled in the art to practice the innovation, including making and using any devices or systems and performing any incorporated methods. The patentable scope of the innovation is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method of detecting a fault in a bleed air system of an aircraft, the method comprising:
    transmitting, from sensors of the bleed air system, bleed air flow rates from multiple engines of the aircraft;
    determining, by a controller, a difference between the transmitted bleed air flow rates to define a difference value;
    comparing, by the controller, the difference value to a reference difference value;
    determining, by the controller, a fault condition with the bleed air system when the comparing indicates the difference value satisfies the reference difference value; and
    providing, by the controller, an indication of the fault upon the determining of the fault condition, wherein providing the indication includes at least one of: providing the alert regarding the fault on a display within the aircraft, or providing the indication to a ground system.

2. The method of claim 1, further comprising determining an average of the bleed air flow rates from the multiple engines to define an average transmitted bleed air flow rate.

3. The method of claim 2, wherein the determining the difference comprises comparing the transmitted bleed air flow rate of one of the multiple engines with the average transmitted bleed air flow rate to define the difference value.

4. The method of claim 3, wherein the average is a running average.

5. The method of claim 3, wherein the transmitted bleed air flow rate of one of the multiple engines used for the comparing is also used in the determining an average.

6. The method of claim 1, wherein the reference difference value is an acceptable difference threshold.

7. The method of claim 6, wherein when the comparing indicates a difference greater than the acceptable difference threshold the fault is determined.

8. The method of claim 6, wherein the acceptable difference threshold is a predetermined flow rate difference value.

9. The method of claim 1, wherein one of the bleed air flow rates is transmitted from each of the multiple engines.

10. The method of claim 4, wherein the transmitted bleed air flow rate of one of the multiple engines used for the comparing is also used in the determining an average.

11. The method of claim 7, wherein the acceptable difference threshold is a predetermined flow rate difference value.

* * * * *